Sept. 13, 1932.  F. VAN ACKER  1,876,800
IMPROVEMENT IN FRACTIONATORS
Filed March 31, 1930   3 Sheets-Sheet 2

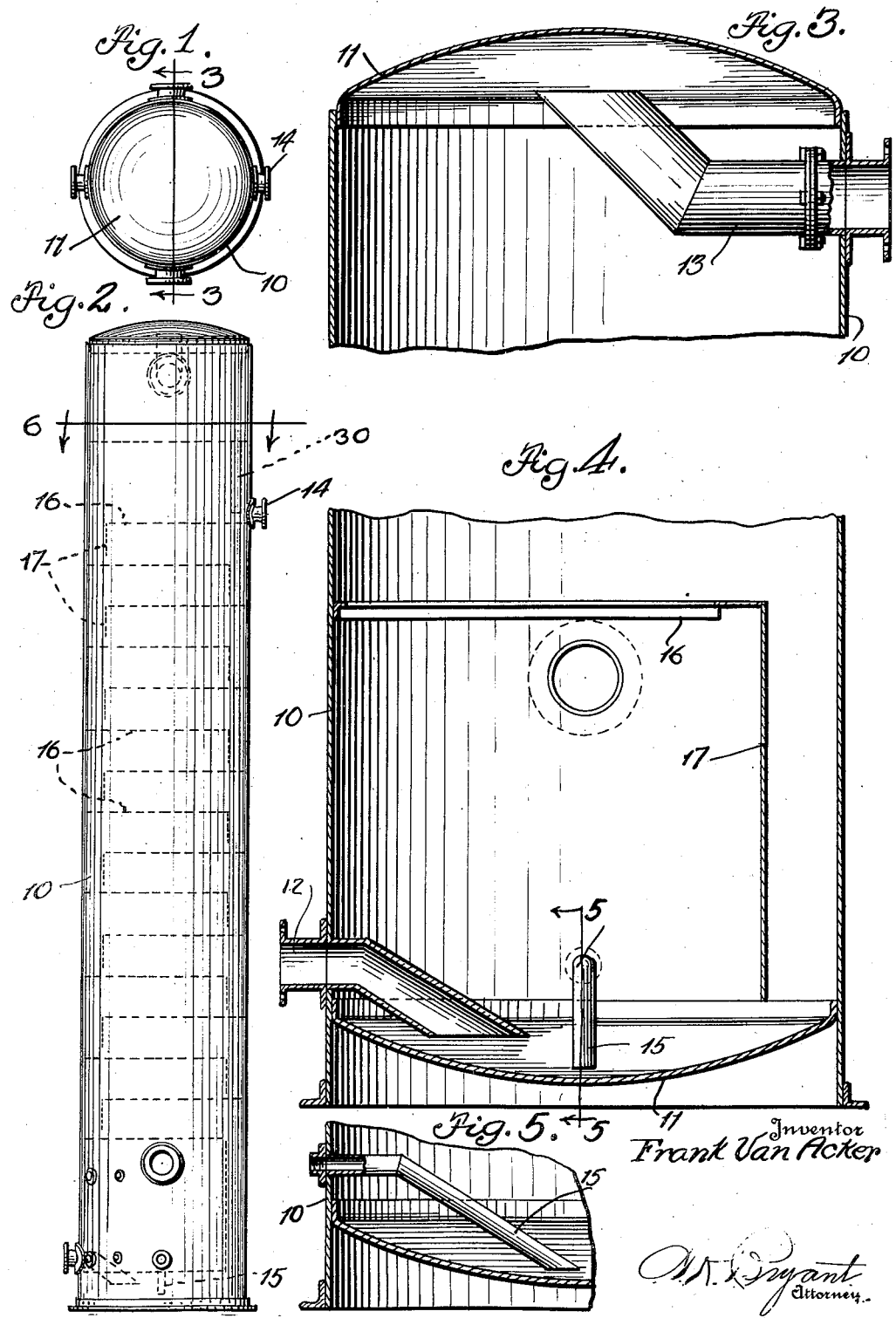

Inventor
Frank Van Acker.

By F. K. Bryant,
Attorney

Sept. 13, 1932.     F. VAN ACKER     1,876,800
IMPROVEMENT IN FRACTIONATORS
Filed March 31, 1930     3 Sheets-Sheet 3

Inventor
Frank Van Acker.
By
Attorney.

Patented Sept. 13, 1932

1,876,800

UNITED STATES PATENT OFFICE

FRANK VAN ACKER, OF TULSA, OKLAHOMA, ASSIGNOR TO PETROLEUM ENGINEERING, INC., A CORPORATION OF DELAWARE

IMPROVEMENT IN FRACTIONATORS

Application filed March 31, 1930. Serial No. 440,410.

This invention relates to the art of oil refining and has special reference to a refining tower of the type known as a fractionating tower wherein oil, gas or vapor flows upwardly and mingles with a descending stream of liquid oil.

More particularly the invention relates to the mixing trays which are used in fractionators and similar devices.

One important object of the present invention is to provide an improved general construction of such trays.

A second important object of the invention is to provide an improved form of bubbler tray so constructed that the ascending gases or vapors pass through the descending liquids in small bubbles of substantially uniform size.

A third important object of the invention is to provide an improved device of this description having a perforated bubble forming plate completely immersed in a body of the liquid through which it is desired that the bubbles of ascending gases or vapors shall pass.

A fourth important object of the invention is to provide an improved construction of such a tray wherein the tray plates, nozzle openings, caps and perforated plates are formed from channel members arranged in a novel and improved manner.

With the above and other objects in view the invention consists in general of certain novel details of construction and combinations of parts hereinafter fully described, illustrated in the accompanying drawings and specifically claimed.

In the accompanying drawings, like characters of reference indicate like parts in the several views, and:—

Figure 1 is a plan view of a tower embodying this invention;

Figure 2 is a side elevation thereof;

Figure 3 is an enlarged detail section of the upper part of such a tower on the line 3—3 of Figure 1;

Figure 4 is a similar section of the lower part of the tower;

Figure 5 is a section on the line 5—5 of Figure 4;

In the embodiment of the invention here shown, the trays have been shown as used in a fractionating tower, but it is to be understood that these trays may be used for a wide variety of apparatus for absorption stripping, fractionation and rectification of gas, gasoline, crude oil, benzol toluol, naphtha, and other hydrocarbons as well as many other liquids, vapors and gaseous substances.

Figure 6:
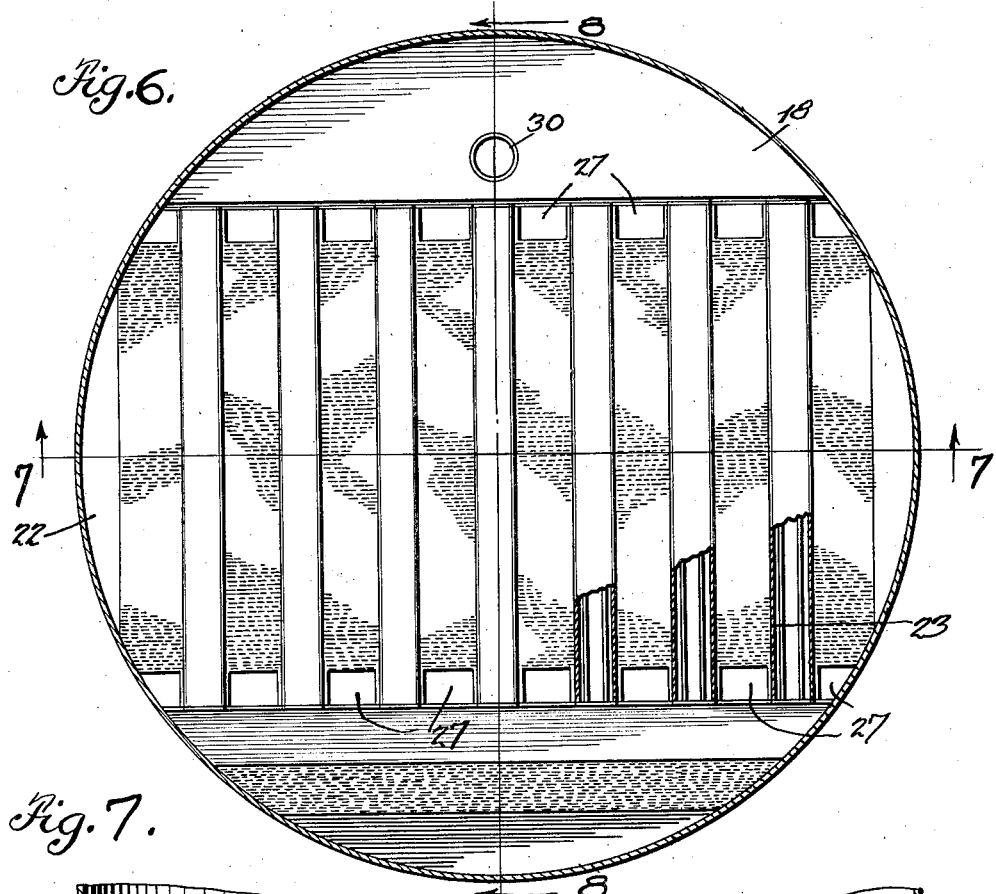
Figure 6 is an enlarged section on the line 6—6 of Figure 2.
Figure 7:
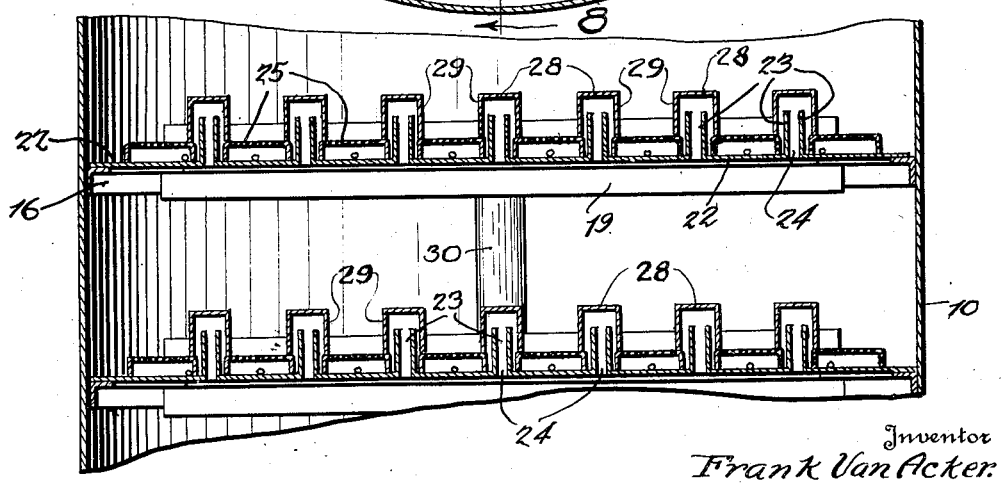
Figure 7 is a section on the line 7—7 of Figure 6.
Figure 8:
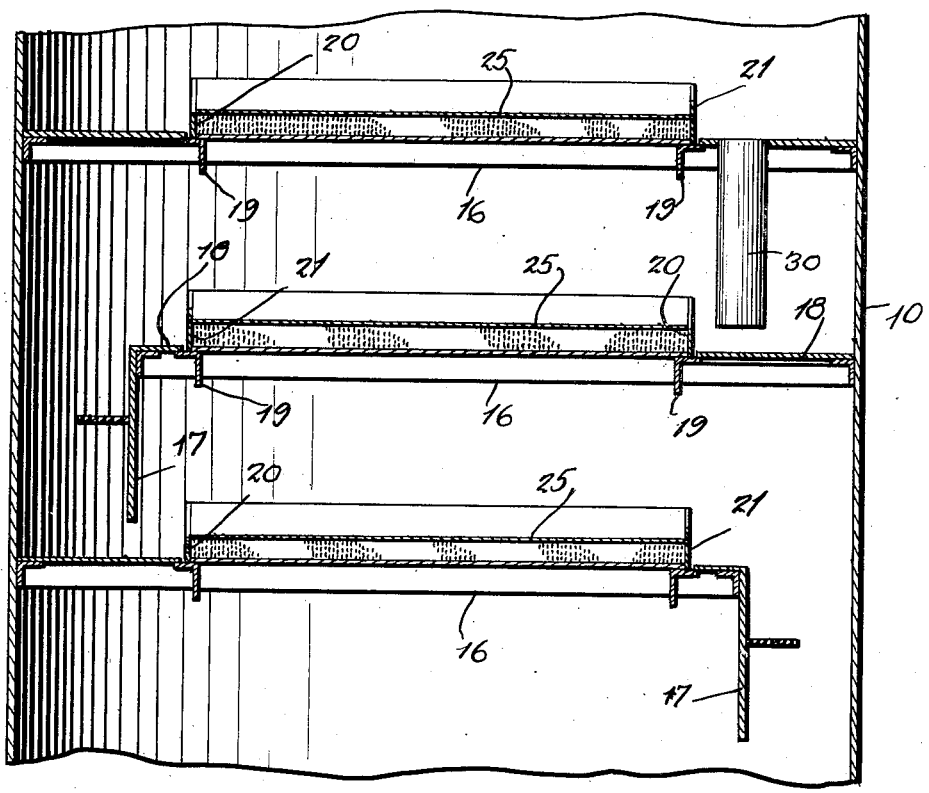
Figure 8 is a section on the line 8—8 of Figure 6.
Figure 9:
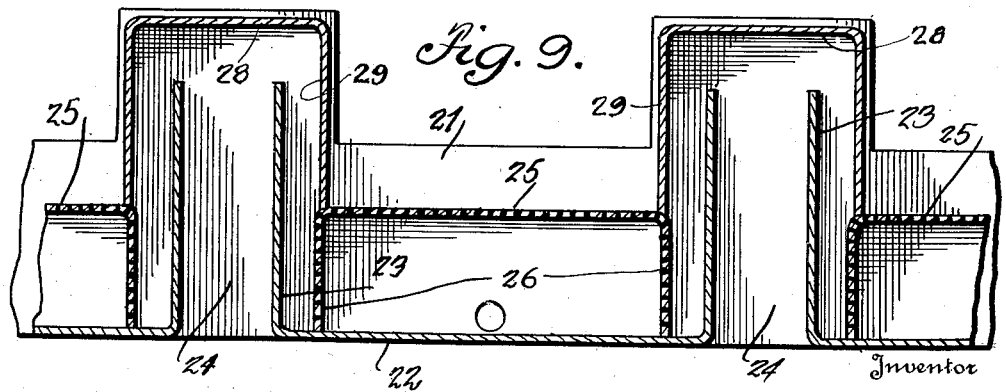
Figure 9 is a still further enlarged fragmentary detail sectional view similar to Figure 7.

In the present form there is shown an elongated vertical shell 10 closed at its top and bottom by ends 11 of dome shape and arranged with their concave sides inwardly. Leading into the lower end of the shell is an inlet 12 for the gas, vapor or the like to be treated and the treated substance passes out of the shell through an outlet 13 at its upper end. Similarly an inlet 14 admits the absorption oil or other liquid through which the substance under treatment is to pass and an outlet or draw off pipe 15 at the lower end permits withdrawal of such liquid. Supporting angles 16 are spaced vertically on the inside of the shell and extend circumferentially therearound. Staggered baffles 17 are also positioned in the shell and have their ends securely welded or otherwise fixed thereto. Deck plates 18 rest on these angles 16 and lap at their inner edges on parallel tray bars 19. There is a pair of these bars 19 at each deck and each tray is provided at one end with a baffle 20 and its other end with a weir 21. Bottom tray plates or base members extend from each weir to the corresponding baffle and are in the form of channel plates having horizontal webs 22 and upstanding flanges 23, one flange being omitted from each end plate and the webs of the end plates being curved to conform to the shape of the shell as shown best in Figure 6. The flanges of adjacent plates are spaced as shown in Figures 7 and 9 to provide gas nozzles 24. Between the flanges of each of these channels there is a perforated bubble plate likewise of channel form and having a horizontal web 25 and downturned flanges 26 resting on the respective web 22 and spaced from the flanges 23 of that web. Both the web 25 and flanges 26 are provided with a multiplicity of perforations and each bubble plate, while extending from weir to baffle, is provided in each end of its web with a circulating opening 27. Cap channels also extend between the weir and baffle of each tray and have each a horizontal web 28 and downturned flanges 29 resting on the respective perforated bubble channel or plate at its side edges. At the top deck a flow pipe 30 may be substituted for the baffle 17.

The several parts of each tray are welded together or secured by any other desired means to form a unitary structure.

In operation liquid of desired character is introduced at the top of the tower and flows down from deck to deck through the down spout or flow pipe 30 and through the openings between the shell and baffles 17 which thus also form down spouts. The weirs 21 are sufficiently high to seal the lower ends of these down spouts and also to totally submerge the bubble plates. The gas or vapor or mixture being treated flows up through the nozzles of the lower deck and down through the spaces between the sides of said nozzles and the caps and then through the perforations in the flanges 26 and up through the perforations in the webs 25, thus bubbling twice through the liquid. Similarly the substance being treated passes each deck or tray in its upward movement and then the treated substance passes out of the shell through the outlet 13.

There has thus been provided a simple and efficient device of the kind described and for the purpose specified.

It is obvious that changes may be made in the form and construction of the invention without departing from the principles thereof. It is not therefore desired to confine the invention to the exact form herein shown and described, but it is desired to include all such as come within the scope claimed.

I claim:—

1. In apparatus of the class described, a contact tray having elongated spaced base members running from side to side of the tray, said members having upturned flanges forming flow nozzles, channel shaped caps having downturned flanges and covering said nozzles from end to end thereof, and channel shaped perforated bubble plates each having downturned flanges resting on the respective base plate in spaced relation to its flanges, said caps having their flanges resting on the bubble plates at the side edges thereof, said bubble plates having flow openings at the ends of their webs.

2. In apparatus of the class described, a contact tray having elongated spaced base members running from side to side of the tray, said members having upturned flanges forming flow nozzles, channel shaped caps having downturned flanges and covering said nozzles from end to end thereof, channel shaped perforated bubble plates each having downturned flanges resting on the respective base plate in spaced relation to its flanges, and plates closing the ends of the channel shaped members, one of said plates being sufficiently higher than the other to constitute a weir for regulating the height of liquid on said tray.

3. In apparatus of the class described, a contact tray having elongated spaced base members running from side to side of the tray, said members having upturned flanges forming flow nozzles, channel shaped caps having downturned flanges and covering said nozzles from end to end thereof, channel shaped perforated bubble plates each having downturned flanges resting on the respective base plate in spaced relation to its flanges, said caps having their flanges resting on the bubble plates at the side edges thereof, and plates closing the ends of the channel shaped members, one of said plates being sufficiently higher than the other to constitute a weir for regulating the height of liquid on said tray.

4. In apparatus of the class described, a contact tray having elongated spaced base members running from side to side of the tray, said members having upturned flanges forming flow nozzles, channel shaped caps having downturned flanges and covering said nozzles from end to end thereof, channel shaped perforated bubble plates each having downturned flanges resting on the respective base plate in spaced relation to its flanges, said caps having their flanges resting on the bubble plates at the side edges thereof, said bubble plates having flow openings at the ends of their webs, and plates closing the ends of the channel shaped members, one of said plates being sufficiently higher than the other to constitute a weir for regulating the height of liquid on said tray.

In testimony whereof I affix my signature.

FRANK VAN ACKER.